United States Patent [19]

Ziberna et al.

[11] Patent Number: 4,990,723
[45] Date of Patent: Feb. 5, 1991

[54] BULKHEAD CONNECTOR

[75] Inventors: Rick P. Ziberna, Chicago; Timothy D. Kaptur, Crestwood, both of Ill.

[73] Assignee: General Motors Corporation, Detroit, Mich.

[21] Appl. No.: 461,954

[22] Filed: Jan. 8, 1990

[51] Int. Cl.$^5$ ............................................. H01B 17/26
[52] U.S. Cl. ................................................ 174/152 R
[58] Field of Search .................. 174/18, 152 R, 153 R

[56] References Cited

U.S. PATENT DOCUMENTS

| 3,423,518 | 1/1969 | Weagant | 174/153 G |
| 3,619,482 | 11/1971 | Boor | 174/152 G |
| 4,407,042 | 10/1983 | Schramme et al. | 16/2 |

FOREIGN PATENT DOCUMENTS

| 667229 | 2/1952 | United Kingdom | 174/153 R |

*Primary Examiner*—Laramie E. Askin
*Attorney, Agent, or Firm*—F. J. Fodale

[57] ABSTRACT

A bulkhead connector assembly for supporting a bus bar as it passes through a bulkhead including a rectangular portion having a substantially rectangular cross section and including a rectangular passageway extending therethrough and a circular portion having a substantially circular cross section and including a circular passageway extending therethrough and in communication with the rectangular passageway of the rectangular portion. A mounting flange which is integral with the rectangular and circular portions is disposed intermediate of the rectangular and circular portions for mounting the assembly to a bulkhead. The circular passageway of the circular portion has a plurality of shoulders within the circular passageway with the shoulders defining a rectangular passage within the circular passageway which substantially corresponds to the rectangular passageway of the rectangular portion for mounting and supporting a bus bar as it passes through a bulkhead.

24 Claims, 1 Drawing Sheet

BULKHEAD CONNECTOR

BACKGROUND OF THE INVENTION

(1) TECHNICAL FIELD

The invention relates to a bulkhead connector assembly for mounting and supporting a bus bar as it passes through a bulkhead.

(2) DESCRIPTION OF THE PRIOR ART

The subject invention is directed toward a bulkhead connector assembly for mounting and supporting a bus bar as it passes through a bulkhead. The subject invention has been designed for use with pressurized cabinets employed to house high voltage equipment. One environment wherein high voltage equipment is housed in pressurized cabinets is in conjunction with locomotives. Locomotives generally employ high voltage equipment such as magnetic switchgears comprising a plurality of contactors which are housed, along with microprocessor control systems, in high voltage cabinets. In the past, housing a plurality of contactors within one cabinet often required a plurality of cables interconnecting the contactors with other equipment. In these systems, the large number of cables running from the contactors were routed through a side wall in the cabinet near the flooring upon which the cabinet rested in the locomotive. This resulted in a confused "rats nest" of cable within the cabinet.

In addition, the contactors and associated power cables generate a relatively large amount of heat which was particularly detrimental to the microprocessor control systems with which they were housed. Further, because of the nature of the contactors and microprocessor control systems, it was important to keep the high voltage cabinets clean and dust free. To this end, large duct work was employed to deliver pressurized air to the cabinet to maintain a positive pressure therein and thereby reduce the possibility of dust particles and dirt from entering the closed system.

However, preventing dust and dirt from infiltrating the system was particularly difficult where the multitude of tangled cables passed through a plurality of apertures typically disposed through a bulkhead in the cabinet at a lower portion near the flooring upon which the cabinet rested in the locomotive. To prevent these leaks, cleats were disposed within the apertures to seal the apertures and to form an interface between the bulkhead of the cabinet and the cables.

In an effort to improve the system, simplify production requirements, maintain ability and realize cost savings, a more modular design has been adopted by the assignee of the subject invention. More specifically, the heat generating elements (power cabling and electromagnetic switchgear) have been separated from the microprocessor control systems and disposed in a separate and smaller cabinet. In this way, it is possible to eliminate large duct work previously employed to deliver an additional 750 CFM of air to maintain the high voltage cabinet at an acceptable operating temperature.

The new modular design further includes the use of solid copper bus bars which extend from the electromagnetic switchgear through the cabinet to an externally disposed lugged powered cable via a bulkhead connector.

The bulkhead connector of the subject invention facilitates the effective, sealed connection between the electromagnetic switchgear and power cables by supporting the bus bars in an effective manner as they pass through a bulkhead in a high voltage cabinet and in also sealing the interior of the pressurized cabinet from air leaks.

SUMMARY OF THE INVENTION AND ADVANTAGES

The subject invention is directed toward a bulkhead connector assembly for supporting a bus bar as it passes through a bulkhead. The bulkhead connector assembly includes a rectangular portion having a substantially rectangular cross section and including a rectangular passageway extending therethrough. The assembly further includes a circular portion having a substantially circular cross section and including a circular passageway extending therethrough and in communication with the rectangular passageway of the rectangular portion. A mounting flange which is integral with the rectangular and circular portions is disposed intermediate of the rectangular and circular portions for mounting the assembly to the bulkhead. The assembly is characterized by the circular passageway of the circular portion having a plurality of shoulders within the circular passageway with the shoulders defining a rectangular passage within the circular passageway which substantially corresponds to the rectangular passageway of the rectangular portion for mounting and supporting the bus bar as it passes through the bulkhead.

Accordingly, the subject invention provides a bulkhead connector assembly for efficiently and effectively mounting and supporting a bus bar as it passes through a bulkhead. Further, the assembly is adapted for sealing the cabinet from air leaks which prevents moisture and dirt from entering the cabinet and prevents leakage past or shorting to adjacent connections and also guards against safety hazards when the terminals are live.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
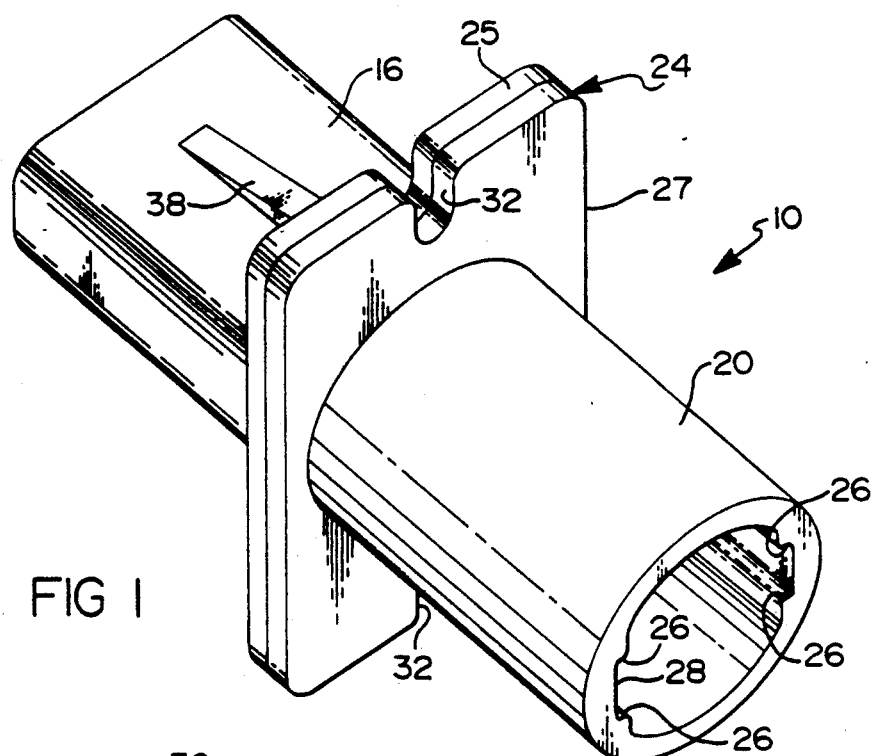
FIG. 1 is a perspective view of the subject invention.
Figure 2:
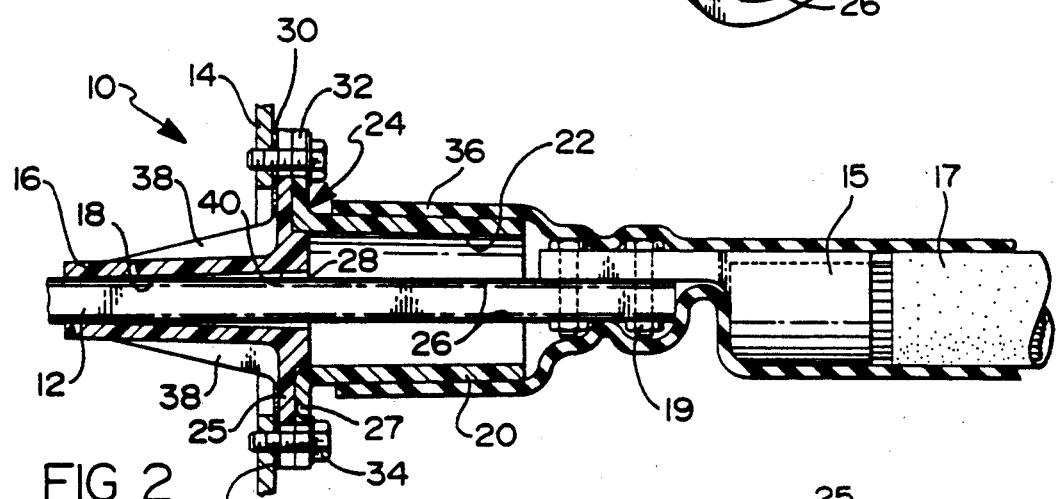
FIG. 2 is a cross-sectional side view of the subject invention mounted to a bulkhead with the bus bar connected to a lugged power cable.
Figure 3:
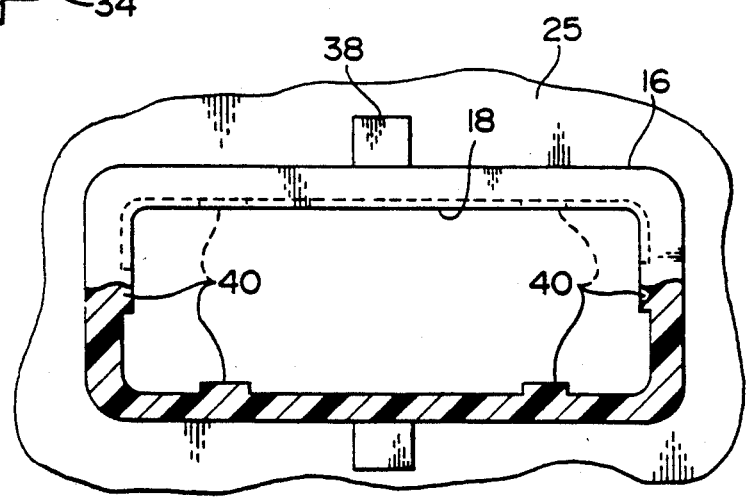
FIG. 3 is an end view of the rectangular portion 16 of the subject invention with the flange 25 broken away and with a portion shown in cross section.

A bulkhead connector assembly for supporting a bus bar 12 as it passes through a bulkhead 14 is generally indicated at 10 in FIGS. 1 and 2. The bulkhead 14 may be a side wall of a pressurized electrical cabinet employed for storing high voltage equipment such as electromagnetic switchgear comprising a plurality of contactors or the like. More specifically, the subject invention is directed toward a bulkhead connector assembly which is particularly adapted for use in mounting and supporting rectangular copper bus bars which extend between contactors of the electromagnetic switchgear housed within the pressurized cabinet, through the bulkhead connector and fastened at their opposite ends to a lugged power cable 15 in a locomotive. The lugged power cable 15 is fixedly mounted to the bus bar 12 via fasteners 19. The bulkhead connector assembly 10 includes a rectangular portion 16 having a substantially rectangular cross-section and including a rectangular passageway 18 extending therethrough. The assembly 10 further includes a circular portion 20 having a substantially circular cross-section and including a circular passageway 22 extending therethrough and in communication with the rectangular passageway 18 of the rectangular portion 16. A mounting flange, generally indicated at 24, which is integral with the rectangular and circular portions 16, 20, respectively, is disposed intermediate of the rectangular and circular portions 16, 20 for mounting the assembly 10 to the bulkhead 14. More specifically, the rectangular and circular portions 16,20 each includes end flanges 25,27 respectively. The end flanges 25,27 are disposed in flush engagement with respect to each other and are adhesively bonded together to form the mounting flange 24. In this way, the rectangular passageway 18 of the rectangular portion 16 is in communication with the circular passageway 22 of the circular portion 20.

The circular passageway 22 of the circular portion 20 has a plurality of shoulders 26 within the circular passageway 22. The shoulders 26 define a rectangular passage 28 within the circular passageway 22 which substantially corresponds to the rectangular passageway 18 of the rectangular portion 16 for mounting and supporting the bus bar 12 as it passes through the bulkhead 14. The shoulders 26 extend axially along the circular passageway 22 to form a rectangular passage 28 within the circular passageway 22.

The assembly 10 further includes a mounting gasket 30 which is disposed between the mounting flange 24 and the bulkhead 14 for providing sealing engagement between the mounting flange 24 and the bulkhead 14. The mounting flange 24 includes at least one slot 32 disposed in the flange 24 for adjustably receiving a fastener 34 therethrough for mounting the assembly 10 to the bulkhead 14. More specifically, the assembly includes two slots 32 which are oppositely disposed with respect to one another on the mounting flange 24. The slots 32 are U-shaped and open at one end for adjustably receiving a fastener 34, typically self-tapping mounting screws, therethrough. In the preferred embodiment, the gasket is a cork/rubber material with an application of silicone printoseal, which distributes the load evenly between the two self-tapping mounting screws.

The circular passageway 22 of the circular portion 20 has an opening at one end thereof. The assembly includes a sealing member 36 which is disposed about the outer periphery of the circular portion 20 and covers the opening in the circular portion 20 for providing sealing engagement with the circular portion 20 as the bus bar 12 extends through the assembly 10. In the preferred embodiment, the sealing member 36 is a heat shrink tubular member for sealing the opening in the circular portion 20 of the assembly 10. The heat shrink tubing 36 overlaps the circular portion 20 of the assembly 10, the bolted connection between the bus bar 12 and the lugged power cable 15 at the fasteners 19 and the cable insulation jacket 17 behind the lug. In this way, the heat shrink tubular member 36 will seal the pressurized cabinet from air leaks, prevent moisture or dirt from entering the cabinet, prevent leakage paths or shorting to adjacent connections and guard against safety hazards when the terminals are live.

The rectangular portion 16 further includes at least one support rib 38 extending axially along the outer periphery thereof and having an increasing thickness axially along the rectangular portion 16 from the rectangular portion to the mounting flange 24. More specifically, the rectangular portion 16 includes two support ribs 38 oppositely disposed with respect to one another and extending axially along the outer periphery of the rectangular portion 16 with increasing thickness from the rectangular portion 16 to the mounting flange 24. The ribs 38 are included to add strength to the assembly.

In addition, the rectangular passageway 18 of the rectangular portion 16 includes a plurality of guide ribs 40 which extend axially along the passageway 18 for guiding the bus bar when the bar 12 is disposed through the rectangular passageway 18 and for providing a snug fit between the assembly 10 and the bus bar 12. The guide ribs 40 have an increasing thickness, in the form of a 1' draft angle, as the guide ribs 40 extend axially along the rectangular passageway 18. In this way, the guide ribs 40 provide an increasingly snug fit as the bus bar extends through the passageway.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A bulkhead connector assembly for supporting a bus bar as it passes through a bulkhead, said assembly comprising;
   a rectangular portion having a substantially rectangular cross section and including a rectangular passageway extending therethrough;
   a circular portion having a substantially circular cross section and including a circular passageway extending therethrough and in communication with said rectangular passageway of said rectangular portion;
   a mounting flange integral with said rectangular and circular portions and disposed intermediate of said rectangular and circular portions for mounting said assembly to a bulkhead;
   said assembly characterized by said circular passageway of said circular portion having a plurality of shoulders within said circular passageway, said shoulders defining a rectangular passage within said circular passageway which substantially corresponds to said rectangular passageway of said rectangular portion for mounting and supporting a bus bar as it passes through a bulkhead.

2. An assembly as set forth in claim 1 further characterized by said shoulders extending axially along said circular passageway to form said rectangular passage within said circular passageway.

3. An assembly as set forth in claim 2 further characterized by said assembly including a mounting gasket disposed adjacent said mounting flange for providing sealing engagement between said mounting flange and a bulkhead.

4. An assembly as set forth in claim 3 further characterized by said circular passageway in said circular portion having an opening at one end thereof, said assembly including a sealing member disposed about the outer periphery of said circular portion and covering said opening in said circular portion for providing sealing engagement with said circular portion as the bus bar extends through said assembly.

5. An assembly as set forth in claim 4 further characterized by said sealing member being a heat shrink tubular member for sealing said opening in said circular portion of said assembly.

6. An assembly as set forth in claim 5 further characterized by said mounting flange including at least one slot disposed in said flange for adjustably receiving a fastener therethrough for mounting said assembly to a bulkhead.

7. An assembly as set forth in claim 6 further characterized by including two slots oppositely disposed with respect to one another on said mounting flange.

8. An assembly as set forth in claim 7 further characterized by said slots being U-shaped and open at one end for adjustably receiving a fastener therethrough for mounting said assembly to a bulkhead.

9. An assembly as set forth in claim 8 further characterized by said rectangular portion including at least one support rib extending axially along the outer periphery thereof and having increasing thickness axially along said rectangular portion from said rectangular portion to said mounting flange.

10. An assembly as set forth in claim 9 further characterized by said rectangular portion including two support ribs oppositely disposed with respect to one another and extending axially along the outer periphery of said rectangular portion and having increasing thickness axially along said rectangular portion from said rectangular portion to said mounting flange.

11. An assembly as set forth in claim 10 further characterized by said rectangular passageway of said rectangular portion including a plurality of guide ribs extending axially along said rectangular passageway for guiding a bus bar when said bar is disposed through said rectangular passageway and for providing a snug fit between said assembly and the bus bar.

12. An assembly as set forth in claim 11 further characterized by said guide ribs having increasing thickness as said guide ribs extend axially along said rectangular passageway for providing an increasing interference fit as the bus bar extends through said rectangular passageway.

13. An electrical cabinet assembly for storing high voltage equipment, said assembly comprising;
at least one cabinet wall member forming a bulkhead and a bulkhead connector for supporting a bus bar as it passes through said bulkhead;
said bulkhead connector including a rectangular portion having a substantially rectangular cross section and including a rectangular passageway extending therethrough;
a circular portion having a substantially circular cross section and including a circular passageway extending therethrough and in communication with said rectangular passageway of said rectangular portion;
a mounting flange integral with said rectangular and circular portions and disposed intermediate of said rectangular and circular portions and mounted to said bulkhead;
said assembly characterized by said circular passageway of said circular portion having a plurality of shoulders within said circular passageway, said shoulders defining a rectangular passage within said circular passageway which substantially corresponds to said rectangular passageway of said rectangular portion for mounting and supporting a bus bar as it passes through said bulkhead.

14. An assembly as set forth in claim 13 further characterized by said shoulders extending axially along said circular passageway to form said rectangular passage within said circular passageway.

15. An assembly as set forth in claim 14 further characterized by said assembly including a mounting gasket disposed between said mounting flange and said bulkhead for providing sealing engagement between said mounting flange and said bulkhead.

16. An assembly as set forth in claim 15 further characterized by said circular passageway in said circular portion having an opening at one end thereof, said assembly including a sealing member disposed about the outer periphery of said circular portion and covering said opening in said circular portion for providing sealing engagement with said circular portion as the bus bar extends through said assembly.

17. An assembly as set forth in claim 16 further characterized by said sealing member being a heat shrink tubular member for sealing said opening in said circular portion of said assembly.

18. An assembly as set forth in claim 17 further characterized by said mounting flange including at least one slot disposed in said flange and adjustably receiving a fastener therethrough mounting said mounting flange to said bulkhead.

19. An assembly as set forth in claim 18 further characterized by including at least two slots oppositely disposed with respect to one another on said mounting flange.

20. An assembly as set forth in claim 19 further characterized by said slots being U-shaped and open at one end and each adjustably receiving a fastener therethrough mounting said mounting flange to said bulkhead.

21. An assembly as set forth in claim 20 further characterized by said rectangular portion including at least one support rib extending axially along the outer periphery thereof and having increasing thickness axially along said rectangular portion from said rectangular portion to said mounting flange.

22. An assembly as set forth in claim 21 further characterized by said rectangular portion including two support ribs oppositely disposed with respect to one another and extending axially along the outer periphery of said rectangular portion and having increasing thickness axially along said rectangular portion from said rectangular portion to said support flange.

23. An assembly as set forth in claim 22 further characterized by said rectangular passageway of said rectangular portion including a plurality of guide ribs extending axially along said rectangular passageway for guiding a bus bar when said bar is disposed through said rectangular passageway and for providing a snug fit between said assembly and the bus bar.

24. An assembly as set forth in claim 23 further characterized by said guide ribs having increasing thickness as said guide ribs extend axially along said rectangular passageway for providing an increasingly snug fit as the bus bar extends through said rectangular passageway.

* * * * *